United States Patent [19]

Patel

[11] Patent Number: 5,008,337
[45] Date of Patent: Apr. 16, 1991

[54] METHOD OF CROSSLINKING RUBBER

[75] Inventor: Raman Patel, Akron, Ohio

[73] Assignee: Monsanto Company, St. Louis, Mo.

[21] Appl. No.: 424,413

[22] Filed: Oct. 20, 1989

Related U.S. Application Data

[63] Continuation-in-part of Ser. No. 179,814, Apr. 11, 1988, abandoned.

[51] Int. Cl.$^5$ .................... C08L 13/00; C08L 25/02
[52] U.S. Cl. .................................. 525/130; 525/123; 525/126; 525/127
[58] Field of Search ............... 525/130, 123, 127, 126

[56] References Cited

U.S. PATENT DOCUMENTS

| 3,179,716 | 4/1985 | Bruin | 525/130 |
| 4,046,745 | 9/1977 | Selman et al. | 260/77.5 CR |
| 4,202,950 | 5/1980 | Statton | 525/123 |
| 4,574,140 | 3/1986 | Sandstrom et al. | 525/123 |
| 4,742,113 | 5/1988 | Gismondi et al. | 524/762 |

*Primary Examiner*—Patricia Short
*Attorney, Agent, or Firm*—Gordon B. Seward

[57] ABSTRACT

Crosslinking of rubber having a carboxylic functionality is accomplished by heating the rubber in the presence of an isocyanate functionalized compound and an accelerator which is a metal salt of an organic acid. The crosslinked polymers are useful in a variety of shaped articles, and can be in the form of dispersed particles, in a continuous plastic phase.

10 Claims, No Drawings

METHOD OF CROSSLINKING RUBBER

This application is a continuation in part of copending application Ser. No. 179,814, filed Apr. 11, 1988, now abandoned.

The invention relates to a method for crosslinking rubber which is acid-functional, preferably an acid-functional copolymer from alpha olefin monomer and acrylate monomer. Crosslinking is accomplished with an isocyanate functionalized compound, accelerated by a metal salt of an organic acid.

The acid-functional rubbers which are crosslinked by the method of the invention include ethylene-acrylic elastomers. The crosslinking of these rubbers has been accomplished with primary diamines, or with peroxides, although the diamines are preferred. Isocyanate-functionalized compounds or polymers have also been used for this purpose.

BRIEF SUMMARY OF THE INVENTION

It has now been discovered that acid-functional rubbers, especially acid-functional copolymer rubbers from alpha olefin monomer and acrylate monomer, can be much more rapidly cross-linked with isocyanates by accelerating the isocyanate-crosslinking with a metal salt of an organic acid.

DETAILED DESCRIPTION

The acid-functional copolymer rubbers used in the method of the invention are acid-functionalized diene homopolymers or copolymers with styrene or acrylonitrile, or EPDM rubber. Preferred rubbers are copolymers from alpha olefin monomer and alkyl acrylate monomer. Suitable alpha olefins for polymerization of such copolymer rubbers include ethylene, propylene, butene-1, isobutylene, pentenes, heptenes, octenes, and the like or mixtures thereof; $C_1$–$C_4$ alpha olefins are preferred and ethylene is often most preferred. Suitable alkyl acrylates for copolymerizing with the alkene include methyl acrylate, ethyl acrylate, t-butyl acrylate, n-butyl acrylate, 2-ethylhexyl acrylate, and the like or a mixture thereof; $C_1$–$C_{12}$ alkyl acrylates are often preferred, and $C_1$–$C_4$ alkyl acrylates are most often preferred. In many cases a preferred olefin/acrylic ester copolymer rubber comprises unsaturated carboxylic acid monomer units, such as acid units, e.g. derived from (meth)acrylic acid or maleic acid, anhydride units, e.g. derived from maleic anhydride or partial ester units, e.g. derived from mono ethyl maleate. In many cases a preferred olefin/acrylic ester copolymer rubber is a terpolymer of ethylene, $C_1$–$C_4$ alkyl acrylate and an acidic monomer unit; more preferably such terpolymer comprises at least about 30 mole percent of ethylene, about 10 to 69.5 mole percent of methyl acrylate and about 0.5 to 10 mole percent mono ethyl maleate. Suitable rubbers are described on pages 325–334, Volume 1 of the Encyclopedia of Polymer Science and Engineering (2nd Ed). Commercial rubbers of this type are sold by du Pont under the trademark, VAMAC. In all cases it is preferred that the rubber be essentially non-crystalline and have a glass transition temperature ($T_g$) below room temperature, i.e. below about 23°. Other, less preferred rubbers include carboxylicfunctional nitrile rubber, polyisoprene, polybutadiene, styrene-butadiene rubber, EPDM rubber or hydrogenated derivatives of any of these rubbers.

Crosslinking agents employed in the method of this invention are polyfunctional, i.e. at least difunctional, compounds selected to cure the rubber, i.e. crosslink the rubber, by covalently bonding with the reactive functional groups of the rubber. The covalent crosslinking agent is a compound with an isocyanate reactive functional group. Effective crosslinking agents include isocyanates such as toluene di-isocyanate or isocyanate-terminated polyester prepolymers. Generally, the amount of crosslinking agent does not exceed about 15 percent by weight of the copolymer rubber, depending on the molecular weight of the rubber and crosslinking agent. Preferred amounts of crosslinking agent are readily determined by routine experimentation to optimize desired properties of the compositions of this invention. The amount of crosslinking agent and the degree of crosslinking can be characterized in terms of the cure rate parameters as measured by a curemeter or rheometer, as is well known in the rubber industry.

The accelerators used in the method of the invention are metal salts of organic acids. Preferred organic acids are carboxylic acids of from 2 to 20 carbon atoms, including as formic, acetic, propanoic, butanoic, lauric, oleic, stearic, palmitic and undecanoic acids. Most preferred is stearic acid. The metals which form the preferred salts include calcium, copper, aluminum, cadmium, cobalt and magnesium, with magnesium being especially preferred.

The method comprises heating the rubber in the presence of the crosslinking agent and the accelerator. As indicated above the amounts used are readily determined by experimentation, but are usually in the range of from 0.1 to 25 parts of crosslinking agent and 0.1 to 5 parts of accelerator by weight per 100 parts of rubber by weight. The time and temperature of such treatment can also be easily determined. Preferred temperatures range from above room temperature to below the decomposition temperature for the rubber, and are usually in the range of from 100° to 250° C. Higher temperatures permit shorter treatment times; typically the highest practical temperature will be used, in order to minimize the time required.

The ingredients, rubber, crosslinking agent and accelerator should be intimately mixed, using standard rubber mixing equipment, such as mills and internal mixers. Care should be taken during mixing not to prematurely activate the crosslinking step, which is typically accomplished after the rubber is shaped into a finished product, as in a mold, or by extrusion or calendering. In an alternative method, the rubber can be dispersed in a continuous plastic phase, such as polyolefin or polyester, and vulcanized under shear to produce a thermoplastic elastomer.

A better understanding of the invention will be obtained by reference to the following examples in which all parts are by weight and all temperatures are in degrees celsius, unless otherwise indicated.

EXAMPLE 1

In order to evaluate the method of the invention, a number of rubber compounds were prepared and tested. Preparation was done by admixing the ingredients in a laboratory mill at room temperature, with a number of different crosslinking agents and accelerators. After mixing, samples of the compounds were tested at 180° C. in an Oscillating Die Rheometer, to determine their cure parameters. Several crosslinking agents and accelerators outside the scope of the method of the invention were also incorporated and tested, as comparisons. The formulations and test results are set forth in Table I. In all cases, the rubber was VAMAC-G, believed to be a neat copolymer from ethylene, methyl acrylate and monoethyl maleate.

The following abbreviations were used for the materials:

| Material | Abbreviation |
|---|---|
| Acetate (salt) | A |
| Stearate (salt) | ST |
| Methylene dianiline | MDA |
| Toluene diisocyanate | TDI |
| Diphenyl guanidine | DPG |
| Dicumyl peroxide | DICUP |

Mondur E-501 (MON) is an isocyanate-terminated polyester prepolymer containing about 19% NCO. Aclyn 246 (ACL) is a low molecular weight magnesium ionomer, manufactured by Allied Signal, based on an ethylene polymer. HVA is metaphenylene bis-maleimide.

The rheometer results are expressed in terms of time and torque parameters, which characterize the curing behavior of the rubber in the presence of the different crosslinkers and accelerators, and their levels. The following terms are used:

ML-minimum torque, in pound-inches.

MH-maximum torque, in pound-inches.

$TS_2$-time, in minutes and seconds, to reach two chart divisions above minimum torque.

$T_{50}$-time, in minutes and seconds, to reach 50% of maximum torque.

$T_{90}$-time in minutes and seconds, to reach 90% of maximum torque.

TABLE I

| Curative | Phr | Activator | Phr | t50 | t90 | ML | MH |
|---|---|---|---|---|---|---|---|
| MON | 10 | None | — | 6:29 | 20:06 | 0.08 | 0.71 |
| MON | 10 | CuAc | .25 | 5:42 | 15:34 | 0.07 | 1.45 |
| MON | 10 | CoAc | .25 | 9:11 | 21:18 | 0.07 | 2.33 |
| MON | 10 | MgSt | .25 | 3.17 | 8.35 | 0.10 | 7.97 |
| MON | 10 | CaSt | .25 | 5:18 | 10:59 | 0.07 | 5.00 |
| MON | 10 | CoSt | .25 | 9.41 | 23:39 | 0.07 | 2.09 |
| MON | 10 | AlSt | .25 | 13:35 | 23.31 | 0.06 | 3.01 |
| MON | 10 | CdSt | .25 | 7.44 | 17.02 | 0.04 | 4.22 |
| MON | 10 | ACL | 2 | 11:06 | 24:25 | 0.06 | 1.02 |
| MDA | 1.25 | DPG | 4 | 4:59 | 11:02 | 0.05 | 3.54 |
| DICUP | 7 | HVA | 2 | 1:05 | 3:02 | 0.10 | 2.83 |
| MON | 7.5 | MgSt | .25 | 2:28 | 4:58 | 0.08 | 2.86 |
| TDI | 4 | MgSt | .25 | 2:45 | 6:43 | 0.08 | 3.55 |

The data in Table I show that, based on both time and torque, Mondur E501 by itself produces only a modest increase in torque, over a long span of time. The addition of a small amount of any of the activators of the invention results in significantly higher maximum torque values, while the minimum torque values are essentially unaffected. The control compositions, 10 and 11, show that, at equivalent maximum torque, the combination of dicumyl peroxide and m-phenylenebismaleimide gives extremely fast cures, which are different to handle. A control experiment (not shown) using magnesium chloride gave no increase in maximum torque over the control with Mondur E501 and no activator.

Although the invention has been illustrated by typical example, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The method of crosslinking a carboxylic-functionalized rubber comprising heating the rubber in the presence of a polyfunctional isocyanate functionalized compound and an accelerator which is a metal salt of an organic acid.

2. The method of claim 1 wherein the rubber is a copolymer from a $C_1$–$C_4$ alkyl acrylate and an alpha olefin of 2–8 carbon atoms.

3. The method of claim 2 wherein the rubber is a copolymer from ethylene and methyl acrylate.

4. The method of claim 3 wherein the carboxylic functionality is provided by a termonomer which is an unsaturated carboxylic acid or a half-ester of an unsaturated dicarboxylic acid.

5. The method of claim 4 wherein the termonomer is monoethyl maleate.

6. The method of claim 5 wherein the copolymer rubber comprises at least about 30 mole percent ethylene, about 10 to 69.5 mole percent methyl acrylate and about 0.5 to 10 mole percent monomethyl maleate.

7. The method of claim 1 wherein the isocyanate functionalized compound is toluene diisocyanate or an isocyanate-terminated polyester prepolymer.

8. The method of claim 1 wherein the accelerator is a metal salt of stearic acid or acetic acid.

9. The method of claim 8 wherein the accelerator is magnesium stearate.

10. The method of claim 9 wherein the rubber is a copolymer from ethylene, methyl acrylate and monomethyl maleate and the isocyanate functionalized compound is an isocyanate-terminated polyester prepolymer.

* * * * *